(12) United States Patent
Kekki

(10) Patent No.: US 8,904,033 B2
(45) Date of Patent: Dec. 2, 2014

(54) BUFFERING MEDIA CONTENT

(75) Inventor: Samuli Tapio Kekki, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 577 days.

(21) Appl. No.: 12/795,255

(22) Filed: Jun. 7, 2010

(65) Prior Publication Data
US 2013/0166772 A1    Jun. 27, 2013

(51) Int. Cl.
*G06F 15/16* (2006.01)

(52) U.S. Cl.
USPC ........... 709/234; 709/230; 709/231; 711/119; 711/154; 711/159; 711/160; 711/161

(58) Field of Classification Search
USPC .......................... 709/230, 231; 711/159, 160
See application file for complete search history.

(56) References Cited

U.S. PATENT DOCUMENTS

| | | | |
|---|---|---|---|
| 6,044,434 A * | 3/2000 | Oliver | 711/110 |
| 6,389,032 B1 * | 5/2002 | Cohen | 370/412 |
| 6,452,950 B1 * | 9/2002 | Ohlsson et al. | 370/516 |
| 7,089,348 B2 | 8/2006 | Parry et al. | |
| 7,146,458 B2 * | 12/2006 | Smirnov et al. | 711/110 |
| 2001/0054121 A1 * | 12/2001 | Proch et al. | 710/57 |
| 2003/0039470 A1 * | 2/2003 | Otsuka et al. | 386/95 |
| 2003/0163823 A1 * | 8/2003 | Logan et al. | 725/89 |
| 2005/0091438 A1 * | 4/2005 | Chatterjee | 710/315 |
| 2007/0168783 A1 * | 7/2007 | Derner et al. | 714/718 |
| 2008/0311997 A1 * | 12/2008 | Goossen et al. | 463/43 |
| 2010/0067873 A1 * | 3/2010 | Sasaki et al. | 386/95 |
| 2010/0077441 A1 * | 3/2010 | Thomas et al. | 725/133 |
| 2010/0235569 A1 * | 9/2010 | Nishimoto et al. | 711/103 |

OTHER PUBLICATIONS

"Implementing Circular Buffers With Bit-Reversed Addressing"—Hendrix et al, Nov. 1997 http://www.cs.virginia.edu/~jg9h/photos/tms320c54x_docs/downloaded/spra292.pdf.*
'Thread: Trick Mode for XDK' [online]. Java.net, Sep. 1, 2009 [retrieved on May 25, 2010]. Retrieved from the Internet: <URL: http://forums.java.net/jive/thread.jspa?messageID=362569>.
'Circular buffer' [online]. Wikipedia, 2008 [retrieved on Apr. 2, 2010]. Retrieved from the Internet: <URL: http://en.wikipedia.org/wiki/Circular_buffer>.
'Circular Buffer' [online]. Cunningham & Cunningham, Inc., 2007 [retrieved on Apr. 2, 2010]. Retrieved from the Internet: <URL: http://c2.com/cgi/wiki?CircularBuffer>.

* cited by examiner

*Primary Examiner* — Randy Scott
(74) *Attorney, Agent, or Firm* — Wolfe-SBMC

(57) ABSTRACT

Media content is downloaded on a media device. Portions of the media content are buffered successively during the download in a buffer on the device. During the buffering, the buffered portions are read for playback. In the buffer, a non-write buffer region trails behind a current playback read position. Upon the buffering reaching an end of the buffer, the buffering of media content is continued between a buffer beginning and the non-write buffer region.

20 Claims, 4 Drawing Sheets

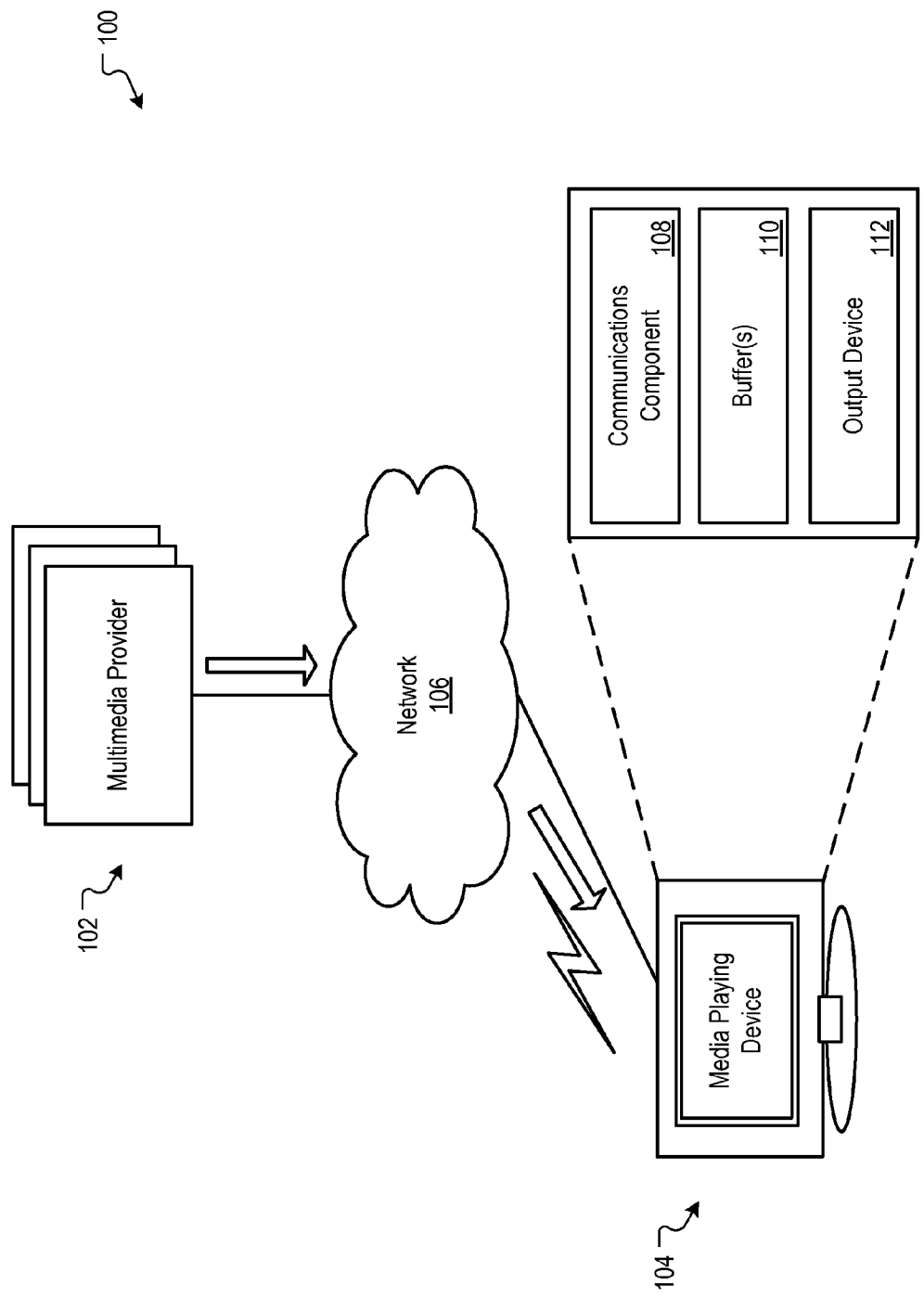

BUFFERING MEDIA CONTENT

BACKGROUND

This specification relates to efficiently using a buffer when buffering application output, such as from an Adobe® Flash® multimedia platform or another multimedia platform. For example, an entire media file can be downloaded and stored in a buffer. The stored media content can be read from the buffer and displayed on a consumer electronic device including, but not limited to a television, a mobile telephone, a personal digital assistant (PDA), a mobile audio or video player, a game console, a Global Positioning System (GPS) receiver, a blu-ray player, a set-top box, an appliance, or other internet connectable digital devices.

SUMMARY

This specification describes technologies related to the downloading, buffering, and playback of media content.

In a first aspect, a download of media content to a device is initiated. Portions of the media content are buffered successively during the download in a buffer on the device. During the buffering, the buffered portions are read for playback. In the buffer, a non-write buffer region trails behind a current playback read position. Upon the buffering reaching an end of the buffer, the buffering of media content is continued between a buffer beginning and the non-write buffer region.

Methods can be implemented in a computer program product tangibly embodied in a tangible program carrier.

Another aspect is a device configured to download, buffer, and playback media content. The device includes a communication component configured to download media content to the device. The device includes a buffer in which portions of the media content are successively buffered during the download. The non-write buffer region trails behind the current playback read position during the download. The device also includes an output device performing playback of the media content. Upon reaching an end of the buffer, buffering continues between the buffer beginning and the non-write buffer region.

Particular embodiments of the subject matter described in this specification can be implemented to realize one or more of the following advantages. Media playing is improved by providing a circular buffer with a non-write area that is available for content replay. Buffer flexibility is increased by dynamically updating buffer sizes and/or characteristics, and by the ability to free up buffer space.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a block diagram of an example system for providing media content to one or more media playing devices for processing and presentation.

Like reference numbers and designations in the various drawings indicate like elements.

DETAILED DESCRIPTION

Figure 2A:
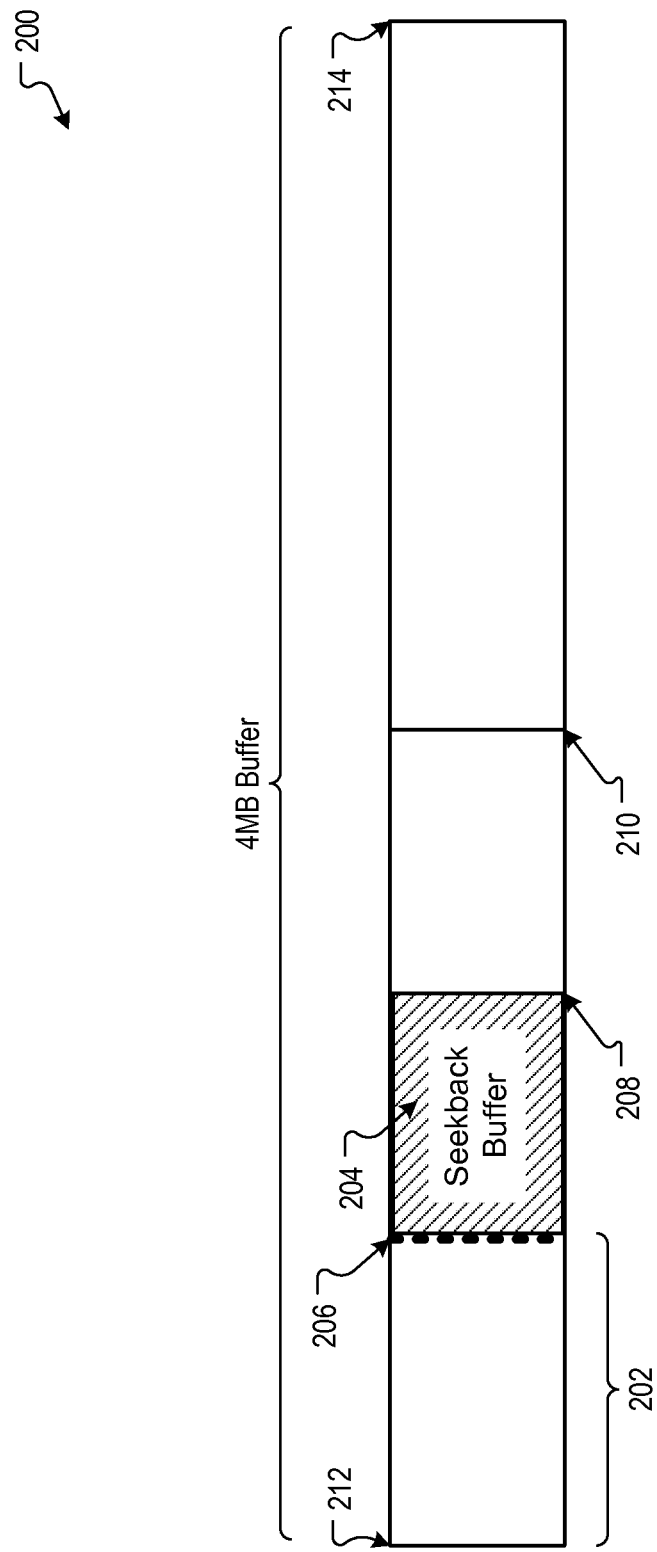
FIGS. 2A-2B are block diagrams of example buffers illustrating the buffering of media content.

FIG. 1 is a block diagram of an example system 100 for providing media content to one or more media playing devices for processing and presentation. In general, the system 100 can facilitate serving of audio and/or video information (e.g., media content) from one or more multimedia providers 102 to one or more media playing devices 104. For example, the system 100 can provide streaming and/or non-streaming (e.g., hypertext transfer protocol (HTTP)) media content. The system 100 can configure a buffer for the media content on the device 104. For example, the system 100 can dynamically configure a size of one or more buffers for holding media content during runtime of the media content. The configuration can include dynamically resizing a circular buffer for holding media content.

Media content can, for example, include web services, web pages, images, advertisements, audio, video, and/or other interactive data. The media content may be accessed over the Internet, and/or another network. For example, the media content can be forwarded from the multimedia provider 102 to the media playing device 104 where data buffering, formatting, decoding, rendering, or other data operations are performed using the content.

The system 100 can be used to supply content to electronic media playing devices targeted toward multimedia enjoyment. The devices may include one or more of a television, a mobile telephone, a personal digital assistant (PDA), a mobile audio or video player, a game console, a Global Positioning System (GPS) receiver, a blu-ray player, a set-top box, an appliance, or other internet or network connectable digital device, to name just a few examples.

As shown in FIG. 1, the system 100 includes one or more multimedia providers 102 that are connectively coupled for communication with one or more media playing devices 104 over a network 106. The media playing device 104 shown in this example is an Internet-connected digital television capable of presenting media content. A television is depicted in FIG. 1, but in other implementations the media playing device 104 may include any device capable of receiving and playing content from multimedia providers 102 or other content providers (not shown) via network 106. In some implementations, the media playing device may be configured to play multiple media content types including, but not limited to, MP3 files and video files.

The device 104 can perform playback of media content. In some implementations, the device 104 reads media content from a media content source, determines audio and/or video buffering requirements, and plays back the media content accordingly. For example, the device 104 is designed or programmed based on which operations should be possible to perform and when to perform the operations. Example operations may include, but are not limited to, playing, pausing, selecting a video size, rewinding, fast forwarding, presenting in slow motion, or selecting a screen position, just to name a few examples. The device 104 can also determine which user-entered actions invoke the performance of the above operations. Example user-entered actions may include a user pressing on a remote control, a local user pressing on the hardware device, or an automatic response to other inputs on the media playing device 104.

The media playing device 104 may include one or more general computing components and/or embedded systems with specific components for performing specific tasks. The media playing device 104 may also include various other elements, such as components for running processes on various machines. Here, each device includes at least one or more processors, memory, one or more communications components 108, one or more buffers 110, and one or more output devices 112. For example, in an implementation involving video files the output device 112 is chosen so that audiovisual output can be generated. Although only one media playing device is depicted, the system 100 may provide media content over network 106 to any number of media playing devices.

The communications component 108 can be configured to download media content to the media playing device 104. The communication component 108 operates based on rules for communicating data between the multimedia provider 102 and the media playing device 104. Such rules can relate to media content rights (e.g., subscription rules and/or digital-content rights rules) and to media access protocols (e.g., how to download content and how to handle downloaded content.)

For example, the device can implement rules about how the buffer 110 is used in the system 100. The rules for using the buffer 110 may pertain to any or all actions, such as playing media, downloading media, uploading media, storing media, overwriting media, finding media, or another action performed using media. Example media rules will be described in detail below.

The buffer 110 can be configured for temporary storage for media content. Portions of the media content can be successively buffered during download. For example, the system 100 can allocate one or more buffers to store media content for presentation on the media playing device. The buffers can be used to ensure media content is presented in a relatively seamless manner on the media playing device 104, for example. To provide such a presentation, the system 100 can allocate an appropriate amount of device memory to one or more buffers and process a portion of incoming media content from the buffers. For example, particular media rules used in system 100 can, in specific situations, allow original media content stored on the buffer be overwritten with newly arriving media content.

The multimedia providers 102 can provide multimedia content and related media services to users of media playing devices. The multimedia content may include drivers, modules, advertisements, libraries, services, signals, media player codecs, movies, television programs, and/or other content including such content that combines one or more of the above content items. Multimedia content can include embedded information, such as embedded media, videos, links, meta-information, and/or machine executable instructions. Multimedia content could also be communicated through RSS (Really Simple Syndication) feeds, radio channels, television channels, print media, websites, or other media. In some implementations, multimedia providers 102 can use the system 100 to provide subscribed access to online television content (e.g., Hulu, network television video, pay per view, etc.), movies, music, sound bytes, ring tones, images, and other media. In some implementations, multimedia providers 102 can provide open access to any media or service downloadable from the Internet over network 106, for example.

The network 106 may include a local area network LAN, a WAN, the Internet, or a combination thereof, connecting multimedia providers 102 and media playing devices 104. In some implementations, the various components communicate via a virtual private network (VPN), Secure Shell (SSH) tunnel, or other secure network connection. Further, the system 100 may store some data at a relatively central location (e.g., accessible over a WAN), while concurrently maintaining local data at a user's site for redundancy and to allow processing during downtime.

The system 100 may include an element or system that facilitates communications among and between various providers, servers, and media playing devices. The system 100 may be networked and include one or more telecommunications networks, such as computer networks, telephone, or other communications networks, the Internet, etc. In some implementations, the system 100 may facilitate data exchange by way of packet switching using the Internet Protocol (IP). In addition, the system 100 may facilitate wired and/or wireless connectivity and communication.

Figure 2B:
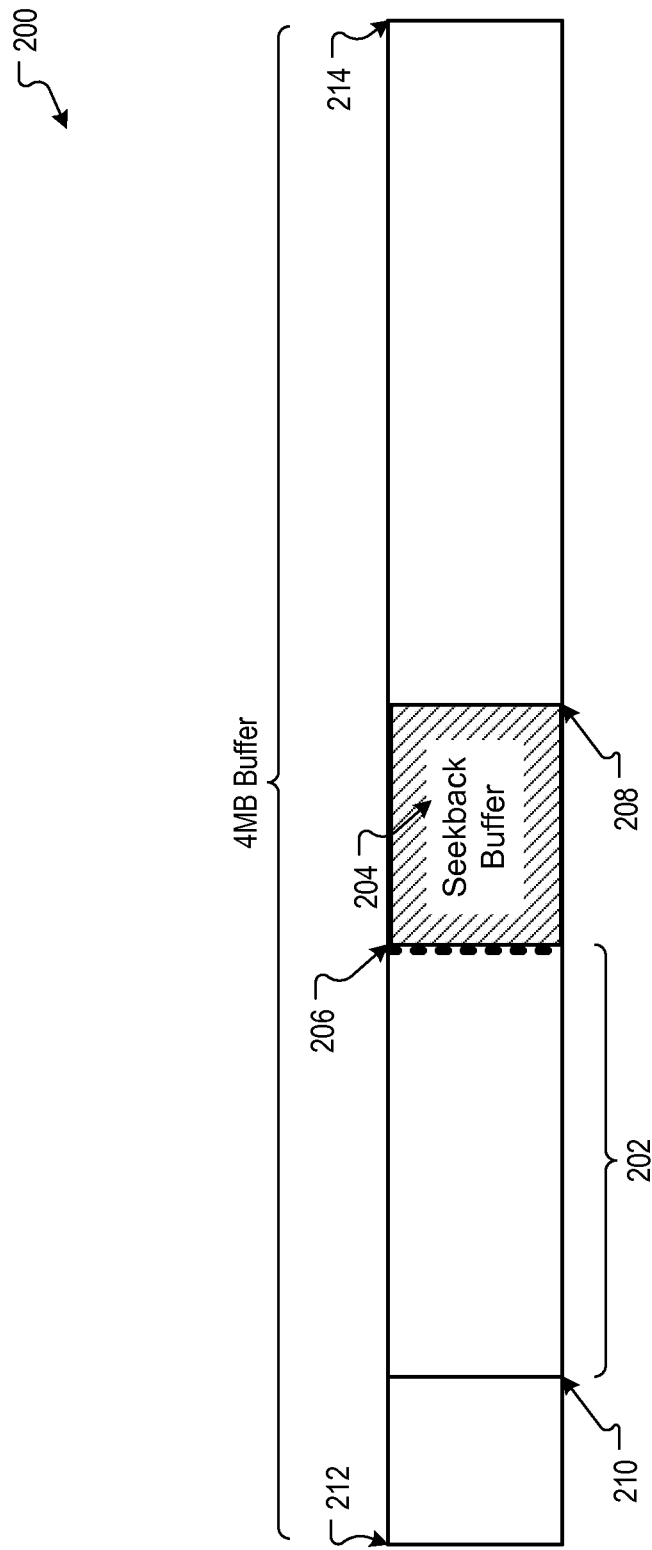

FIGS. 2A-2B are block diagrams of buffers, schematically illustrating example buffering of media content. The buffers depicted in FIGS. 2A-2B represent a four megabyte (MB) buffer at different stages of buffering and playback, in these examples of a ten MB media file. Here, the file is downloaded using hypertext transfer protocol (HTTP) and playback will begin while the file is being buffered. The buffers shown in FIGS. 2A-2B are smaller than the size of the requested media file. In some implementations, the buffer size can vary and can in some examples, be dynamically adapted.

Referring now to FIG. 2A, a four megabyte buffer 200 is depicted at a specific time during the download and playback. The buffer's capacity (4 MB) is here indicated along the length of the buffer. Generally, the buffer 200 in this example can be considered a circular buffer, in that when buffering reaches an end of the buffer, the buffering can in some situations continue by starting over at the beginning of the buffer.

At this moment in time, the buffer 200 includes an overwrite portion 202, a seekback buffer 204, a seekback pointer 206, a playhead pointer 208, and a writehead pointer 210. For example, a pointer is defined by a computer processor and refers to a location within the buffer 200. The buffer 200 is currently shown when a portion of the media file has been downloaded and is being played.

In short, when buffering begins, the writehead pointer 210 can be located at a buffer beginning 212. The writehead pointer 210 is then progressively moved through the buffer (i.e., to the right in the buffer 200 as shown here) as the buffering continues. Each location that the pointer travels through corresponds to a buffer address where information can be stored. Playback is also initiated, for example substantially simultaneously with the buffering. That is, the playhead pointer 208 travels through the buffer 200 corresponding to reading of various buffered portions of the media content for playback. For example, after a portion of buffered information is read, as indicated by the playhead pointer being positioned at the location of that information portion, the information can be forwarded to other pre-playback processing, such as decoding or filtering, and the information can thereafter be output as media content using the output device 112. If the speed of buffering is substantially the same as the speed at which playback information is read from the buffer, then the distance between the playhead pointer 208 and the writehead pointer 210 can remain approximately the same as the two pointers move through the buffer. On the other hand, if either pointer moves faster, then the separation can vary.

Each buffer pointer can move through the buffer until some event occurs. In general, the buffering progresses in accordance with the writehead pointer 210 moving from right to left in the buffer 200. For example, the writehead pointer 210 can move until buffering reaches an endpoint 214. Upon reaching the endpoint 214, some or all of the buffer can be reused, starting from the beginning point 212.

FIG. 2B shows the buffer 200 where the writehead pointer 210 continues the buffering from the buffer beginning 212. For example, upon reaching the endpoint 214, buffering can continue between the buffer beginning point 212 and the seekback buffer 204. Upon buffering continuing after the endpoint 214 is reached, the system 100 can, for example, select buffer address locations starting at the beginning 212 that are not between the seekback pointer 206 and the playhead pointer 208.

The overwrite of media data may be restricted by the system 100. For example, the device 104 can be restricted so that it overwrites only "used," as opposed to "unused," data, and sometimes only a portion of the used data is allowed to be overwritten. The system 100 can track used and unused data using the seekback pointer 206, the playhead pointer 208, and the writehead pointer 210. This terminology can be exemplified as follows: As shown in FIG. 2A, media data to the left of the playhead pointer 208 can be considered used media data, and media data to the right of the playhead pointer 208 can be considered unused media data. The used media data is that which has been played on the device, and the unused media data is that which has been downloaded to the buffer 200 but has not been played.

Regarding the used media content, the seekback buffer 204 indicates the portion thereof that is currently available for replay. The seekback pointer 206 defines a beginning, and the playhead 208 an end, of the seekback buffer. The user can replay any or all media content in the seekback buffer. For example, when the device 104 is a portable media player, the user can replay content by activating a "rewind" control on the device. As another example, when the device has a screen with a progress bar that reflects what part of the media content is being played, the user can replay content by moving a progress bar slider with the cursor.

The size of the seekback buffer 204 can be predefined. For example, if a one-MB seekback buffer is implemented, the seekback pointer 206 will trail the playhead pointer 208 by one MB. That is, the seekback pointer 206 can be defined relative to the playhead pointer 208 and the seekback buffer 204 therefore moves through the buffer during playback. The size of the seekback buffer may be based on the actual media content, for example such that a one-MB seekback buffer is chosen for video content, or such that a one-MB seekback buffer is chosen for media files of a certain size.

In some implementations, the overwrite rule specifies that the seekback buffer 204 is not to be overwritten. That is, when the writehead pointer 210 reaches the buffer end 214 and continues buffering from the buffer beginning 212, it will overwrite some previously buffered and played data with newly downloaded and unplayed data, but no overwriting is done in the seekback buffer 204. Thus, the user is able to seek back in some of the media data also when playing a media file that is larger than the buffer.

In some implementations, the rule that the user can only replay content that is in the seekback buffer 204 is enforced also when the used content to the left of the seekback buffer 204 has not been overwritten. For example, if the user nevertheless attempts to rewind further back than the seekback buffer, the device 104 can simply start replaying the media content that at this moment is at the beginning of the seekback buffer 204.

The seekback buffer 204 can have a partial content portion at its beginning (i.e., immediately right of the seekback pointer 206). For example, during playback the seekback pointer 208 is from time to time located inside a video frame, as opposed to in between two adjacent frames. In such situations, the next video frame (i.e., the first whole video frame inside the seekback buffer) is the earliest available video frame. Partial content portion at the end of the seekback buffer (i.e., immediately left of the playhead pointer 208) can be treated analogously.

Under some circumstances, the device 104 can run out of available buffer space. For example, assume that buffering is continuing starting from the buffer beginning 212, and that data buffering is faster than the reading of buffered data for playback. In such situations, the writehead pointer 210 moves faster than the playhead pointer 208. If this condition exists for a sufficient length of time, the writehead pointer 210 will eventually catch up with the seekback pointer 206. At such a moment, no buffer space is available for further buffering, because data to the left of the writehead pointer 210 is newly buffered and has not been played, and the data between the playhead pointer 208 and the buffer end 214 is also unplayed and therefore not available for overwrite. The device 104 can then pause the buffering (e.g., by halting the HTTP download) as long as necessary. For example, if playback continues, the seekback buffer 204 will eventually move forward by a sufficient amount due to the movement of the playhead pointer 208.

In some implementations, the system 100 can free data or memory space (e.g., de-allocate memory) from a buffer to ensure memory resources are available for incoming data. For example, some or all used media data can be included. In the event that the system 100 de-allocates all used media data, the seekback buffer 204 may be lost, which prevents the user from replaying the media. In some implementations, the freeing up of buffer space occurs only in some or all of the overwrite buffer region 202 during playback such that the seekback buffer 204 is preserved.

Figure 3:
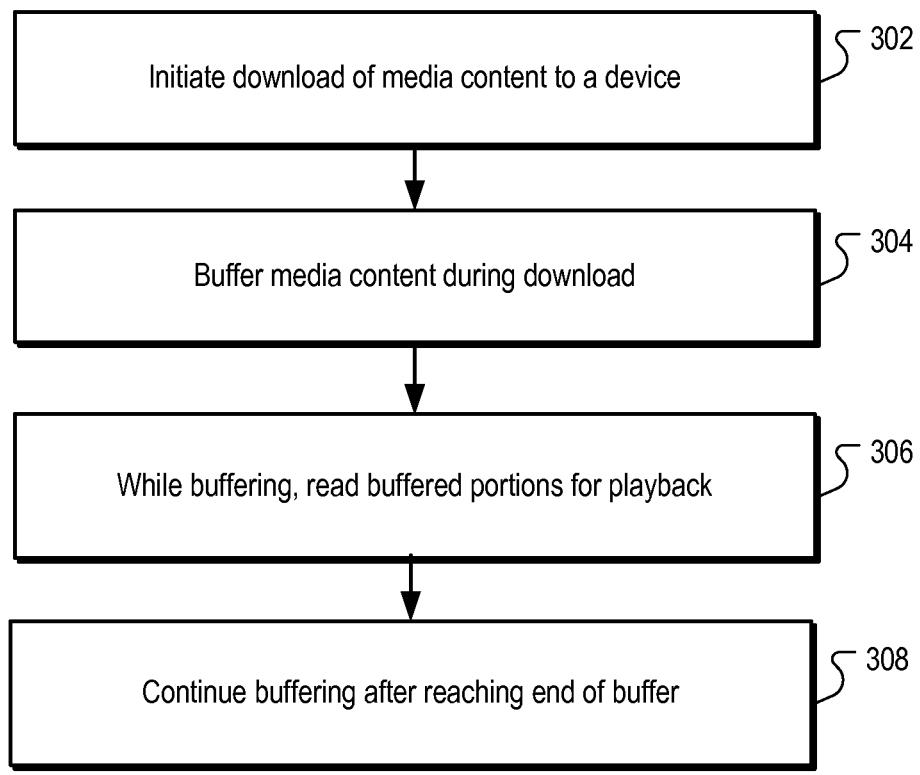
FIG. 3 is a sequential flow diagram of an example method for buffering media content.

FIG. 3 is a sequential flow diagram of an example method 300 for buffering media content. The method 300 depicts the relationship between various system components in the method. Such components can be used for buffering data in an application, such as a Flash® application, in system 100, for example. The method steps shown may be implemented using computer program code in combination with appropriate hardware. Any method steps that are not explicitly mentioned in FIG. 3 may be implemented as described above with reference to FIGS. 1, 2A, and/or 2B.

In step 302, a download of media content to a device is initiated. In some implementations, a download is initiated in system 100 (FIG. 1) upon a user requesting media content to the media playing device 104. For example, the user is viewing a web site and selects a particular song or video to be played. The download may be a streaming media file download or a non-streaming download performed using HTTP.

In step 304, portions of the media content are buffered during download. For example, the system 100 can allocate a particular buffer size. The buffer space can be pre-allocated (e.g., four MB of buffer are allocated at the beginning of download) or allocated incrementally (e.g., buffer size is gradually increased from zero as data arrives from the network 106). In incremental buffer allocation, an endpoint can be defined (cf. the buffer endpoint 214) when the buffer reaches a specific size.

In step 306, while buffering is ongoing, buffered portions of the media content are read for playback. Playback corresponds to the playhead pointer 208 being moved along the buffer 200, for example.

In step 308, buffering is continued after the end of the buffer is reached. For example, when the writehead pointer 210 (FIG. 2A) reaches the buffer end 214, buffering continues (FIG. 2B) after the writehead pointer 210 is moved to the buffer beginning 212.

The method 300 can be interrupted, paused or otherwise modified, for example if available buffer space runs out or if buffer space must be freed for another purpose.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for buffering media content, the method comprising:
    buffering portions of media content successively during a download in a buffer on a device;
    while buffering, reading the buffered portions for playback and playing the media content, in which a non-write buffer region trails behind a current playback read position by a first amount of storage of memory of the device that is increasable up to a second predetermined amount of storage of memory of the device, the non-write buffer region comprising a seekback buffer that includes portions of the media content available for replay; and
    upon the buffering reaching an end of the buffer, continuing the buffering between a buffer beginning and the non-write buffer region.

2. The method of claim 1, further comprising:
    incrementally allocating a size of the buffer for the media content during the buffering, such that the size is zero when the buffering begins and the size is incrementally allocated to a largest buffer size during the buffering.

3. The method of claim 1, further comprising:
    dynamically changing a size of the buffer for the media content during the playback.

4. The method of claim 3, wherein the size of the buffer is dynamically changed without affecting a size of the non-write buffer region.

5. The method of claim 1, wherein the seekback buffer is defined relative to a playhead pointer that moves through the buffer during playback.

6. The method of claim 5, further comprising:
    setting a size of the seekback buffer based on the media content.

7. The method of claim 1, further comprising:
    determining, while continuing the buffering, that no buffer space is available between the buffer beginning and the non-write buffer region; and
    in response to the determination, causing the download to pause while continuing the playback.

8. The method of claim 1, wherein the playback begins simultaneously with the buffering.

9. The method of claim 1, further comprising:
    freeing up, during the playback, at least some buffer space between the buffer beginning and the non-write buffer region.

10. The method of claim 9, further comprising:
    freeing up the non-write buffer region during the playback, such that only non-played portions of the media content are buffered.

11. The method of claim 1, wherein:
    the device is a media playing device configured to play multiple media content types;
    the download is initiated upon a user requesting the media content using the device;
    the download is a non-streaming download performed using hypertext-transfer protocol (HTTP);
    the non-write buffer region comprises a seekback buffer;
    the buffering progresses according to a writehead pointer moving in the buffer;
    the current playback read position is defined by the playhead pointer moving in the buffer;
    the seekback buffer is defined by a seekback pointer separated from the playhead pointer by a predefined amount;
    the buffering is continued upon the writehead pointer reaching the end of the buffer; and
    at least upon continuing the buffering, buffer address locations are selected while ensuring that the buffer address locations are not between the seekback pointer and the playhead pointer.

12. The method of claim 11, further comprising:
    receiving an input from the user during the playback requesting replay of at least part of the media content; and
    in response to the input, repositioning the playback pointer at an earlier location in the buffer and continuing the playback from the earlier location.

13. The method of claim 12, wherein the input requests the replay to begin further back in the media content than the seekback buffer, and wherein the playback pointer is repositioned to a beginning of the seekback buffer in response to the input.

14. A computer program product embodied in a non-transitory program carrier and comprising instructions that when executed by a processor perform a method comprising:
    initiating download of media content to a device;

buffering portions of the media content successively during the download in a buffer on the device;

while buffering, reading the buffered portions and playing the media content, in which a non-write buffer region trails behind a current playback read position by a first amount of storage of memory of the device that is increasable up to a second predetermined amount of storage of memory of the device, the non-write buffer region comprising a seekback buffer that includes portions of the media content available for replay; and upon the buffering reaching an end of the buffer, continuing the buffering between a buffer beginning and the non-write buffer region.

15. The computer program product of claim 14, wherein the instructions that perform the method further comprise:

freeing up, during the playback, at least some buffer space between the buffer beginning and the non-write buffer region.

16. A device comprising:

a communication component configured to download media content to the device;

a buffer in which portions of the media content are successively buffered during the download and during playback of the media content, in which a non-write buffer region trails behind a current playback read position by a first amount of storage of memory of the device that is increasable up to a second predetermined amount of storage of memory of the device, the non-write buffer region comprising a seekback buffer that includes portions of the media content available for replay; and an output device performing playback of the media content, wherein upon an end of the buffer being reached, buffering continues between a buffer beginning and the non-write buffer region.

17. The device of claim 16, wherein the seekback buffer is defined relative to a playhead pointer that moves through the buffer during playback.

18. The device of claim 16, wherein:

the download is a non-streaming download initiated upon a user requesting the media content using the device, the non-streaming download performed using hypertext-transfer protocol (HTTP); and upon determining that no buffer space is available between the buffer beginning and the non-write buffer region, the device causes the non-streaming download to pause while continuing the playback.

19. The device of claim 16, wherein:

the device is a media playing device configured to play multiple media content types;

the download is initiated upon a user requesting the media content using the device;

the download is a non-streaming download performed using hypertext-transfer protocol (HTTP);

the non-write buffer region comprises a seekback buffer;

the buffering progresses according to a writehead pointer moving in the buffer;

the current playback read position is defined by the playhead pointer moving in the buffer;

the seekback buffer is defined by a seekback pointer separated from the playhead pointer by a predefined amount;

the buffering is continued upon the writehead pointer reaching the end of the buffer; and at least upon continuing the buffering, buffer address locations are selected while ensuring that the buffer address locations are not between the seekback pointer and the playhead pointer.

20. The computer program product of claim 15, wherein the instructions that perform the method further comprise:

freeing up the non-write buffer region during the playback, such that only non-played portions of the media content are buffered.

\* \* \* \* \*